United States Patent
Wakamoto

[19]

[11] Patent Number: 6,006,515
[45] Date of Patent: Dec. 28, 1999

[54] EXHAUST DENITRATION DEVICE FOR DIESEL ENGINE

[75] Inventor: Koutaro Wakamoto, Oyama, Japan

[73] Assignee: Komatsu Ltd., Tokyo, Japan

[21] Appl. No.: 08/836,789

[22] PCT Filed: Nov. 16, 1995

[86] PCT No.: PCT/JP95/02344

§ 371 Date: May 19, 1997

§ 102(e) Date: May 19, 1997

[87] PCT Pub. No.: WO96/16255

PCT Pub. Date: May 30, 1996

[30] Foreign Application Priority Data

Nov. 18, 1994 [JP] Japan ................................. 6-308348

[51] Int. Cl.⁶ ............................................. F01N 3/00
[52] U.S. Cl. ................... 60/274; 60/286; 60/301
[58] Field of Search ................. 60/274, 286, 303

[56] References Cited

U.S. PATENT DOCUMENTS

| | | | |
|---|---|---|---|
| 3,943,709 | 3/1976 | Holt ........................................... | 60/274 |
| 4,944,153 | 7/1990 | Goerlich et al. ...................... | 60/286 X |
| 5,021,227 | 6/1991 | Kobayashi et al. .................... | 60/286 X |
| 5,586,433 | 12/1996 | Boegner et al. ........................... | 60/274 |
| 5,606,856 | 3/1997 | Linder et al. .............................. | 60/286 |
| 5,609,021 | 3/1997 | Ma ........................................ | 60/286 X |

FOREIGN PATENT DOCUMENTS

| | | |
|---|---|---|
| 3-253713 | 11/1991 | Japan . |
| 4-214919 | 8/1992 | Japan . |
| 4-358715 | 12/1992 | Japan . |
| 4-358716 | 12/1992 | Japan . |
| 5-1818 | 1/1993 | Japan . |
| 5-44445 | 2/1993 | Japan . |
| 5-133218 | 5/1993 | Japan . |
| 5-214926 | 8/1993 | Japan . |
| 6-108825 | 4/1994 | Japan . |
| 6-137137 | 5/1994 | Japan . |
| 6-146870 | 5/1994 | Japan . |
| 6-235317 | 8/1994 | Japan . |

*Primary Examiner*—John E. Ryznic
*Attorney, Agent, or Firm*—Sidley & Austin

[57] ABSTRACT

The present invention relates to an exhaust denitration device for a diesel engine, which can sufficiently clean NOx under a wide-range of engine operating conditions. To this end, a diesel engine fuel is used as a reducing agent, and a plurality of supply means (5, 6) for supplying the reducing agent fuel are provided at locations between the cylinders of the diesel engine (1) and a catalyst bed (4). In addition, in the case of the diesel engine (1) with an exhaust turbocharger, the first supply means (5) is disposed between an exhaust valve of the diesel engine (1) and an inlet of a turbine (3) of the exhaust turbocharger, and the second supply means (6) is disposed between an outlet of the turbine (3) and the catalyst bed (4).

20 Claims, 7 Drawing Sheets

EXHAUST DENITRATION DEVICE FOR DIESEL ENGINE

TECHNICAL FIELD

The present invention relates to an exhaust denitration device for a diesel engine, and more particularly to an exhaust denitration device for a diesel engine which reduces nitrogen oxides (NOx) in the exhaust gas, discharged from the diesel engine, to $N_2$, $H_2O$, $CO_2$, etc., for removal.

BACKGROUND ART

Hitherto, in reducing NOx from the exhaust gas of a diesel engine, a method has been adopted in which the exhaust gas temperature is increased to the range of 300 to 400° C., ammonia and urea each having the same number of moles as that of NOx are added to the exhaust gas, and after the addition, the NOx is brought into contact with a vanadium/titania catalyst and a zeolite catalyst so as to be reduced and decomposed to $N_2$ and $H_2O$. This method, however, requires an additional preparation of ammonia or urea, and may cause secondary environmental pollution if too much ammonia or urea is added. Thus, to solve such problems, a method has been developed in which the hydrocarbons in the exhaust gas are forcibly enriched, and then the NOx in the exhaust gas is reduced and removed by transition metal-supporting metallosilicate catalysts including a copper/zeolite catalyst, or by transition metal-supporting alumina series composite oxide catalysts including a copper/alumina catalyst.

As methods of enriching the hydrocarbons in the exhaust gas, a method of adding a fuel into a suction pipe of an engine (Japanese Unexamined Patent Publication No. 4-358715), a method in which the timing of the main fuel injection is shifted and a small amount of the fuel is separately injected into the engine cylinders (Japanese Unexamined Patent Publication No. 3-253713), and a method of directly adding fuel or a special hydrocarbon into an exhaust pipe are included. In addition, as techniques for removing NOx by adding a hydrocarbon, which becomes a reducing agent, into the exhaust pipe, a method in which the hydrocarbon-added exhaust gas is guided to a catalyst bed so as to be reduced (Japanese Unexamined Patent Publication No. 4-358716), and a method in which a reducing agent hydrocarbon-added exhaust gas is cooled and guided to the catalyst bed (Japanese Unexamined Patent Publication No. 5-44445), etc., have been known.

However, in the case of a catalytic reaction in which NOx is cleaned by using a hydrocarbon as a reducing agent, the catalyst operating temperature is limited to the range of approximately 300 to 500° C., although it varies with the type of catalyst and reducing agent. Particularly, if the catalyst and the reducing agent hydrocarbon used are limited to one type, respectively, the temperature range is further narrowed.

Thus, to extend the operating temperature range of the catalyst, various methods have been devised. One of them is a method, as disclosed in Japanese Unexamined Patent Publication No. 6-146870, in which a plurality of catalysts having different operating temperature ranges are disposed in series, and a cooling gas is injected over the catalysts so as to control the exhaust gas temperature to be in a range of high reduction efficiency. However, this exhaust gas cleaning device is not practical, because it encounters problems in that the volume of the catalyst and the pressure loss increase. In addition, a method (Japanese Unexamined Patent Publication No. 6-108825) has been known in which a hydrocarbon, which is a fuel, is used as a reducing agent, and is previously decomposed and modified by a cracking catalyst, etc., and then added to the exhaust gas. This method, however, encounters problems of bad decomposition performance of the cracking catalyst, and of bad follow-up properties to variations in the engine load. Further, a method of cooling and controlling the exhaust gas temperature using a heat exchanger (the above-described Japanese Unexamined Patent Publication No. 5-44445) is not practical because it encounters a problem in that soot adheres to a cooling water pipe to block the exhaust pipe, and requires frequent cleaning.

As described above, in cleaning NOx under an extension of the catalyst operating temperature range, i.e., under a wide-range of engine operating conditions, there are many outstanding problems.

SUMMARY OF THE INVENTION

The present invention has been made to solve the problems of the prior art, and its object is to provide an exhaust denitration device for a diesel engine which efficiently cleans NOx under a wide-range of engine operating conditions, and which provides a simple structure.

According to an aspect of the present invention, there is provided an exhaust denitration device for a diesel engine in which an exhaust pipe is provided with a catalyst bed using a hydrocarbon as a reducing agent, and the catalyst bed reduces and cleans the NOx which is exhausted from a diesel engine to the exhaust pipe, wherein the reducing agent is a fuel of the diesel engine, and a plurality of supply means for supplying the reducing agent fuel are provided between the cylinders of the diesel engine and the catalyst bed.

In addition, it is preferable that an exhaust turbocharger be attached to the diesel engine, at least one supply means of the plurality of supply means be disposed between an exhaust valve of the diesel engine and an inlet of a turbine of the exhaust turbocharger, and at least another supply means be disposed between an outlet of the turbine of the exhaust turbocharger and the catalyst bed.

Further, it is preferable that the device comprises a temperature sensor, for detecting the temperature of the catalyst bed; and a controller, to which the temperature sensor inputs a detected temperature; the controller judging and selecting the operation of either of the plurality of supply means based on the detected temperature, and allowing the reducing agent fuel to be supplied from the selected supply means to the exhaust pipe.

An operation of the above-described construction will be described with reference to the drawings. When reducing and cleaning exhaust NOx using hydrocarbons, NOx cleaning temperature properties (maximum cleaning ratio temperature) and a number of carbon atoms per molecule of reducing agent hydrocarbon offer a relationship as shown in FIG. 11. That is, as the carbon number of the reducing agent decreases, a temperature range in which the catalyst effect is exhibited moves to the high-temperature side. In addition, a high molecular weight hydrocarbon, such as a fuel, generally decomposes to lower molecular weight hydrocarbons in a high-temperature oxygen atmosphere. The degree of decomposition, i.e., the carbon number per molecule of the hydrocarbon, varies greatly with the exhaust gas temperature, as shown in FIG. 12.

Incidentally, the temperature of the exhaust gas discharged from the engine, when the diesel engine with the exhaust turbocharger is taken as an example, differs greatly at the inlet of the turbine of the turbocharger and just before the catalyst bed (at the outlet of the turbine), as shown in FIG. 13. Therefore, when adding the reducing agent fuel to the exhaust gas, the degree of thermal decomposition differs at the inlet and the outlet of the turbine. That is, the degree of thermal decomposition when adding the reducing agent fuel at the inlet of the turbine is higher than that when adding at the outlet of the turbine, and the reducing agent fuel is decomposed to a low-molecular fuel.

In addition, it is apparent from FIGS. 11 and 12 that the carbon number of the reducing agent hydrocarbon to be used can be small when the exhaust gas temperature, i.e., the temperature of the catalyst bed is high. On the other hand, when the catalyst bed temperature is low, a reducing agent having a high number of carbon atoms per molecule of the hydrocarbon can preferably be used. Therefore, under an operating condition of a high engine load ratio, i.e., when the catalyst bed temperature is in a high range, the reducing agent fuel is added to the exhaust gas at the inlet of the turbine. On the other hand, under an operating condition of a low engine load ratio, i.e., when the catalyst bed temperature is in a lower range, the reducing agent fuel is added to the exhaust gas at the outlet of the turbine. By adding the reducing agent fuel to the exhaust gas in this way, it becomes possible to optimumly operate the catalyst under a wide temperature range, i.e., a wide-range of engine operating conditions.

For reasons as described above, according to the present invention, two or more reducing agent (hydrocarbon) supply means are provided between the engine cylinders and the catalyst bed. In addition, the supply means are provided upstream of the turbine inlet and downstream of the turbine outlet of the exhaust turbocharger, and are controlled based on the operating condition (detected value of the catalyst temperature), whereby the temperature range in which the catalyst bed effectively operates can be extended. Therefore, the exhaust NOx can be reduced and cleaned under a wide-range of engine operating conditions.

BRIEF DESCRIPTION OF DRAWINGS

FIG. 6 is a diagram showing a case where the engine is at the rated point full load;

FIG. 7 is a diagram showing a case where the engine is at the rated point ¾ load;

FIG. 8 is a diagram showing a case where the engine is at the rated point ½ load;

FIG. 11 is a diagram showing the relationship between the number of carbon atoms per molecule of the reducing agent and the maximum cleaning ratio temperature;

FIG. 12 is a diagram showing the relationship between the exhaust gas temperature and the carbon number of the reducing agent; and FIG. 13 is a diagram showing the change in the exhaust gas temperature at different positions.

BEST MODE FOR CARRYING OUT THE INVENTION

The preferred embodiments of an exhaust denitration device for a diesel engine according to the present invention will be described in detail with reference to the accompanying drawings.

Figure 1:
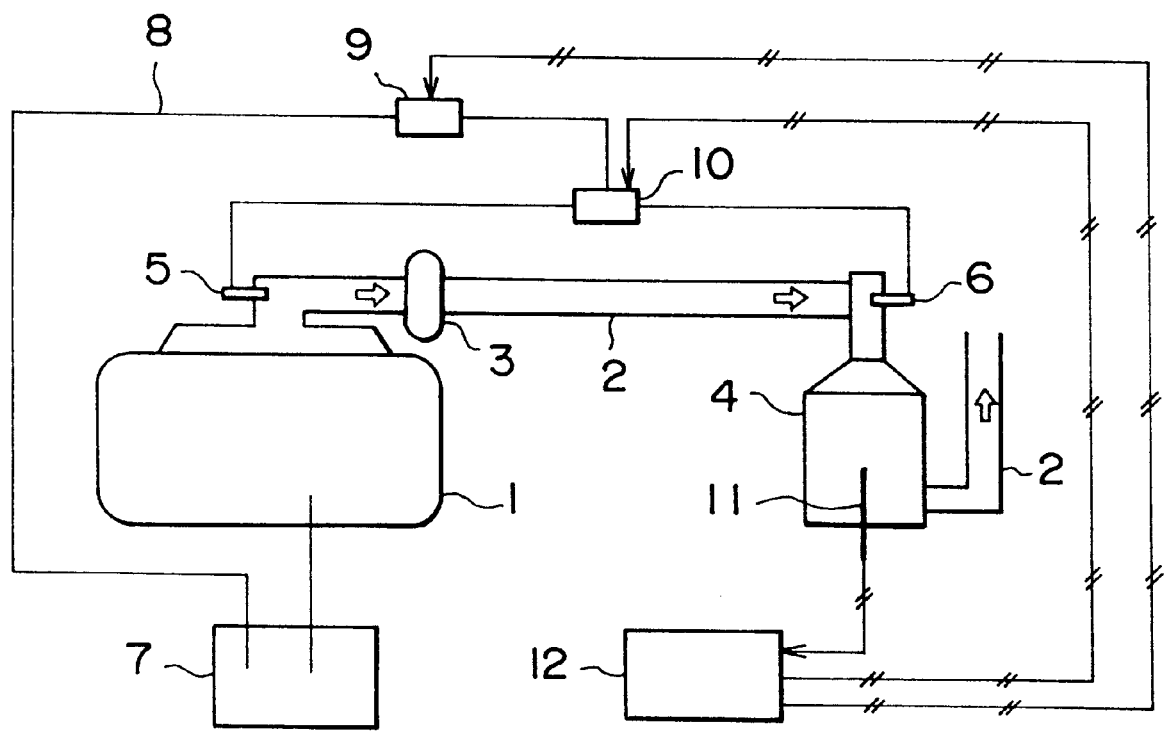
FIG. 1 illustrates a construction of an exhaust denitration device for a diesel engine with an exhaust turbocharger according to a first embodiment of the present invention.

FIG. 1 illustrates a construction of an exhaust denitration device for a diesel engine according to the present invention, in which numeral 1 denotes a diesel engine main body (diesel engine), and 2 denotes an exhaust pipe. A turbine 3 for an exhaust turbocharger (not shown), and a catalyst bed 4, for cleaning NOx, are provided spaced apart along the exhaust pipe 2. In addition, the exhaust pipe 2 is provided with reducing agent adding nozzles 5 and 6, disposed just before an inlet of the turbine 3 and just before the catalyst bed 4 as supply means of reducing agent fuel, respectively. Hereinafter, a reducing agent fuel adding nozzle 5 is referred to as a first nozzle 5, and a reducing agent fuel adding nozzle 6 is referred to as a second nozzle 6. The reducing agent fuel passes from a fuel tank 7 through a reducing agent fuel transport pipe 8, and is fed to the first nozzle 5, or the second nozzle 6 via a nozzle control valve 10 (hereinafter, referred to as a valve 10) by actuation of a reducing agent fuel supply device 9 (hereinafter, referred to supply device 9). The valve 10 is a selecting valve for feeding the reducing agent fuel, discharged from the supply device 9, to the first nozzle 5 or to the second nozzle 6. The supply device 9 and the valve 10 are controlled by a command signal outputted from a controller 12, based on a detection temperature Tcat of a temperature sensor 11 provided in the catalyst bed 4.

Incidentally, although the first nozzle 5 may be preferably disposed near the inlet of the turbine 3, it can be disposed between an exhaust valve (not shown) of the diesel engine main body 1 and the inlet of the turbine 3. In addition, when the first nozzle 5 is disposed to the side of the diesel engine main body 1, it can be disposed in a cylinder. Although the second nozzle 6 may be disposed more preferably just before the catalyst bed 4, it can be disposed between an outlet of the turbine 3 and the catalyst bed 4.

Figure 2:
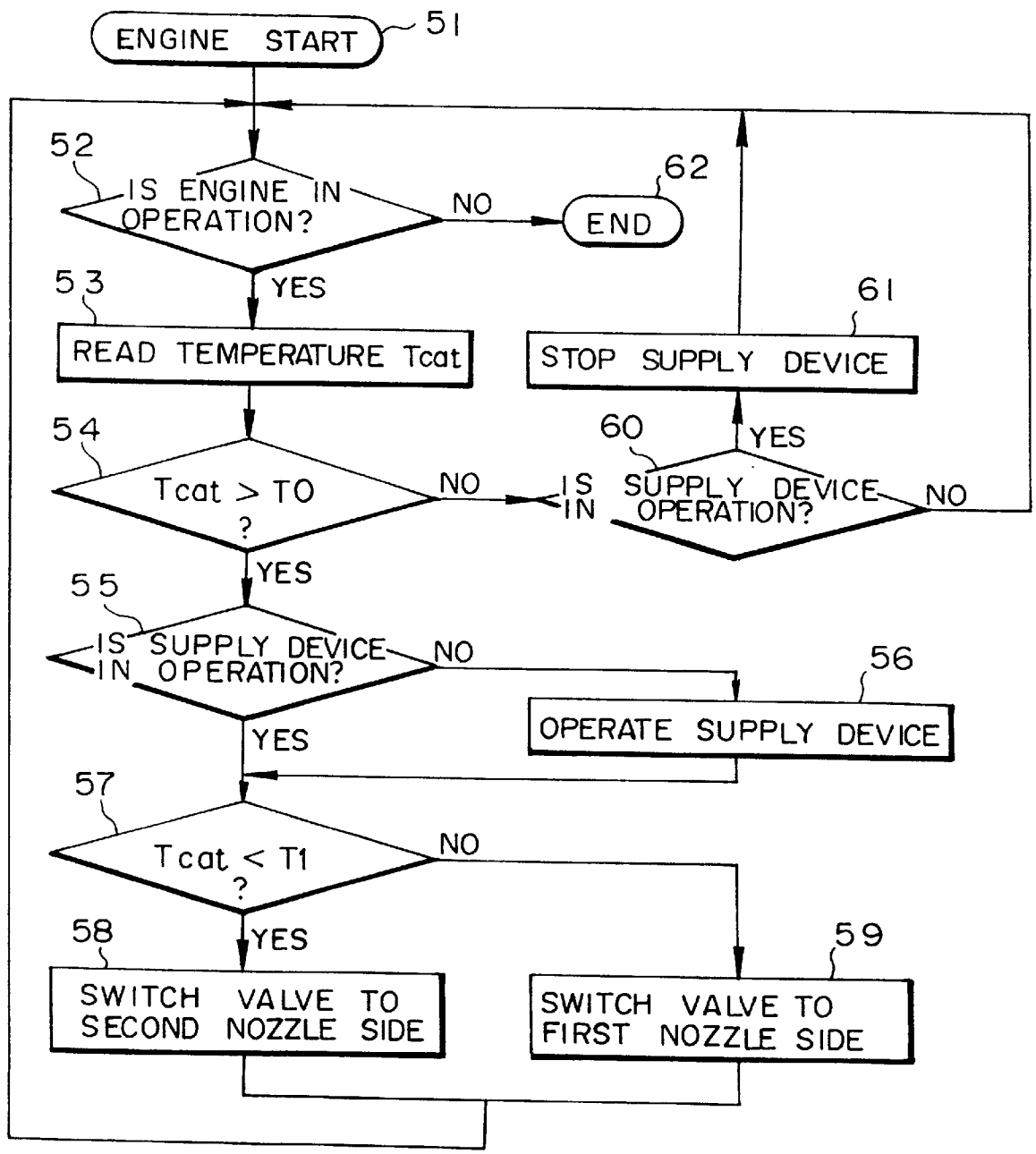
FIG. 2 is a flowchart for explaining a control of the exhaust denitration device of FIG. 1.

FIG. 2 is a flow of a control method for the above-described exhaust denitration device, in which a control routine starts with the starting of the engine in step 51. After checking that an engine is in operation in step 52, the controller 12 reads the detected temperature Tcat of the catalyst bed 4 from the temperature sensor 11 in step 53. After the reading, the procedure advances to step 54 to judge whether or not the detected temperature Tcat is higher than a catalyst operating minimum temperature T0. If Tcat>T0, the procedure advances to step 55, while if Tcat≦T0, the procedure advances to step 60.

In step 55, whether or not the supply device 9 is in operation is judged. If not in operation, the procedure advances to step 56 to operate the supply device 9. The procedure advances to step 57 with the supply device being operated so as to compare the detected temperature Tcat with the reducing agent fuel adding nozzle selecting temperature T1. If Tcat<T1, the procedure advances to step 58 to control and switch the valve 10 to the side of the second nozzle 6, thereby allowing the reducing agent fuel to be injected via the second nozzle 6. If Tcat≧T1, the procedure advances to step 59 to control and switch the valve 10 to the side of the first nozzle 5, thereby allowing the reducing agent fuel to be injected via the first nozzle 5. After performing the above control, the procedure returns to step 52. Incidentally, the temperature T1 is the temperature which is set as needed. In this embodiment, T1 is set to 350° C.

In step 60, the controller 12 judges whether or not the supply device 9 is in operation. If in operation, the procedure advances to step 61 to output an operation-stopping command signal to the supply device 9, and then returns to step 52. If the supply device 9 is stopping, the procedure returns to step 52 as it is. In addition, when the engine 1 is stopping in step 52, the procedure advances to step 62 to finish a controlling operation.

Figure 3:
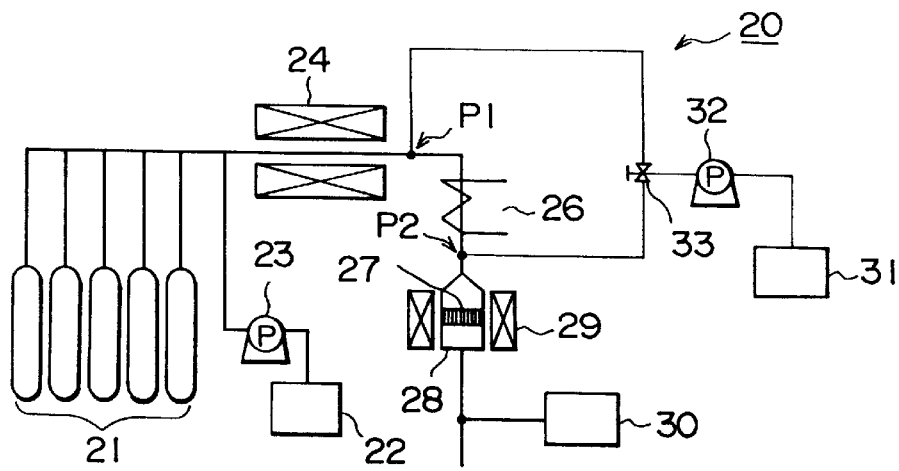
FIG. 3 schematically illustrates a construction of a catalyst evaluation device used in the embodiment of the present invention.

FIG. 3 illustrates a device 20, for the evaluation of a catalyst with a model gas. Adding positions P1, P2 are positions where a fuel, which changes into a reducing agent, can be added. The adding position P1, which is an outlet of a preheating furnace 24, corresponds to the position of the first nozzle 5 shown in FIG. 1, and the adding position P2, which is just before a catalyst bed 27, corresponds to the position of the second nozzle 6.

The evaluation device 20 comprises gas cylinders 21 composed of gas cylinders for each of NO, $O_2$, $CO_2$, $SO_2$, and $N_2$, and a water adding pump 23 attached to a water tank 22. The model gas is formed as a gas simulating engine exhaust gas by providing gases from the gas cylinders 21 and water from the water adding pump 23, and is heated by the preheating furnace 24 to the engine exhaust gas temperature so as to become a high-temperature gas.

The heated model gas is cooled by a gas cooler 26, located just before the catalyst bed 27, to the temperature equivalent to the engine exhaust temperature, and flows into the catalyst bed 27 of the catalytic reaction pipe 28. The model gas denitrated by the catalyst bed 27 is subjected to an NOx measurement by an NOx meter 30. In addition, a reducing agent fuel supply pump 32 attached to a reducing agent fuel tank 31 switches a directional control valve 33 to add the reducing agent fuel via the adding position P1 or via the adding position P2. Incidentally, a general reaction pipe furnace 29 for maintaining the catalyst at a predetermined temperature is located around the catalytic reaction pipe 28.

Figure 4:
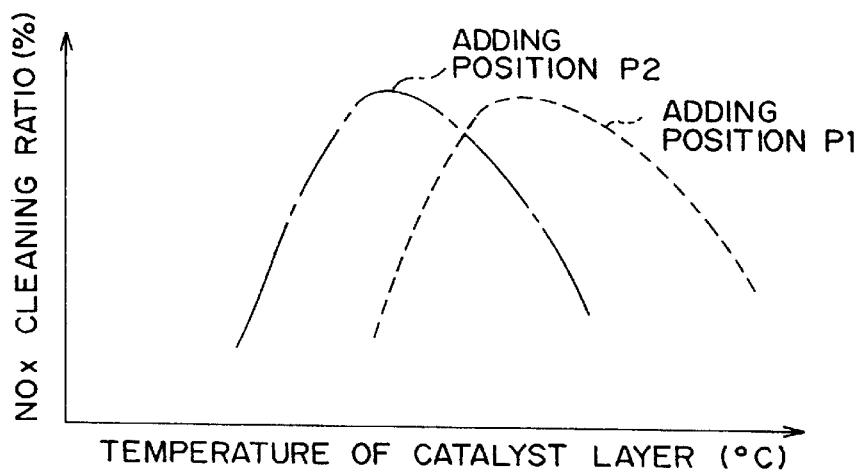
FIG. 4 is a diagram of the evaluation results obtained by the catalyst evaluation device, which show the relationship between the catalyst bed temperature and the NOx cleaning ratio when an adding position of a reducing agent fuel is changed.

FIG. 4 illustrates the results of evaluation of the cleaning ratio for the above-described model gas obtained by the evaluation device 20. That is, an NOx cleaning ratio is affected by the adding positions P1 and P2, and by the temperature of the catalyst bed 27. At the adding position P1, the temperature of the catalyst bed 27 may be relatively high as compared with the adding position P2.

Figure 5:
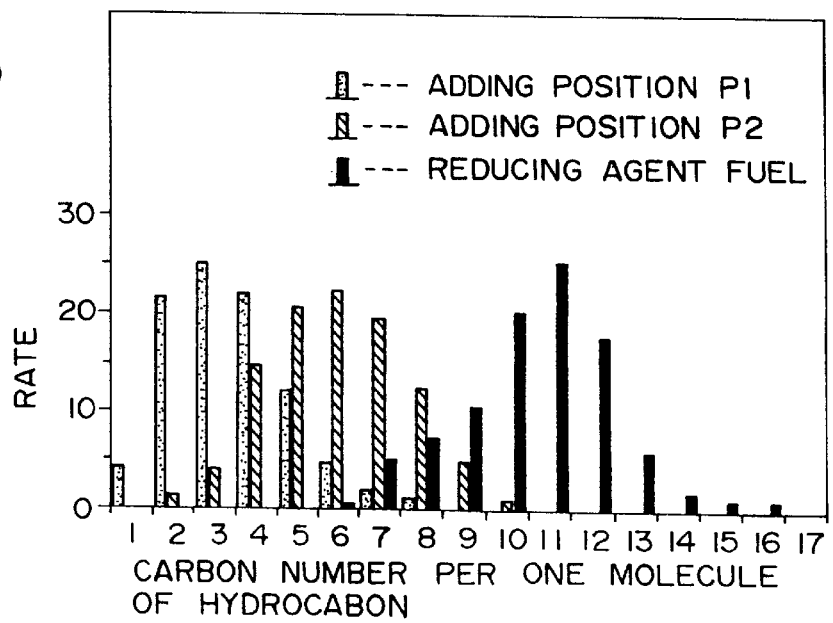
FIG. 5 is a diagram showing the relationship between the reducing agent fuel adding position of the catalyst evaluation device and the degree of thermal decomposition.

FIG. 5 illustrates the result of examination in which the reducing agent fuel (such as kerosene)-added model gas is extracted just before the catalyst layer 27, and shows a distribution of the number of carbon atoms per molecule of fuel hydrocarbon. For comparison, a distribution of the reducing agent fuel itself before thermal decomposition is also shown. That is, when the reducing agent fuel is added at the adding position P1, the fuel hydrocarbons thermally decompose to lower hydrocarbons. However, when added at the adding position P2, it is proved that thermal decomposition scarcely occurs, and the hydrocarbons reach the catalyst bed 27 in a state of the relatively higher hydrocarbons.

Therefore, it is apparent from FIGS. 4 and 5 that the addition of the reducing agent fuel via the adding position P1 exhibits a high-efficiency NOx cleaning performance when the temperature of the catalyst bed 27 is high. That is, by decomposing the reducing agent fuel to lower hydrocarbons before it reaches the catalyst bed 27, high NOx cleaning can be obtained in the high-temperature catalyst bed 27. On the other hand, when the temperature of the catalyst bed 27 is low, a high-efficiency NOx cleaning performance can be obtained by adding the reducing agent fuel via the adding position P2. That is, by maintaining the reducing agent fuel as the higher hydrocarbons until it reaches the catalyst bed 27, the high NOx cleaning ratio is obtained in the low-temperature catalyst bed 27.

Figure 6:
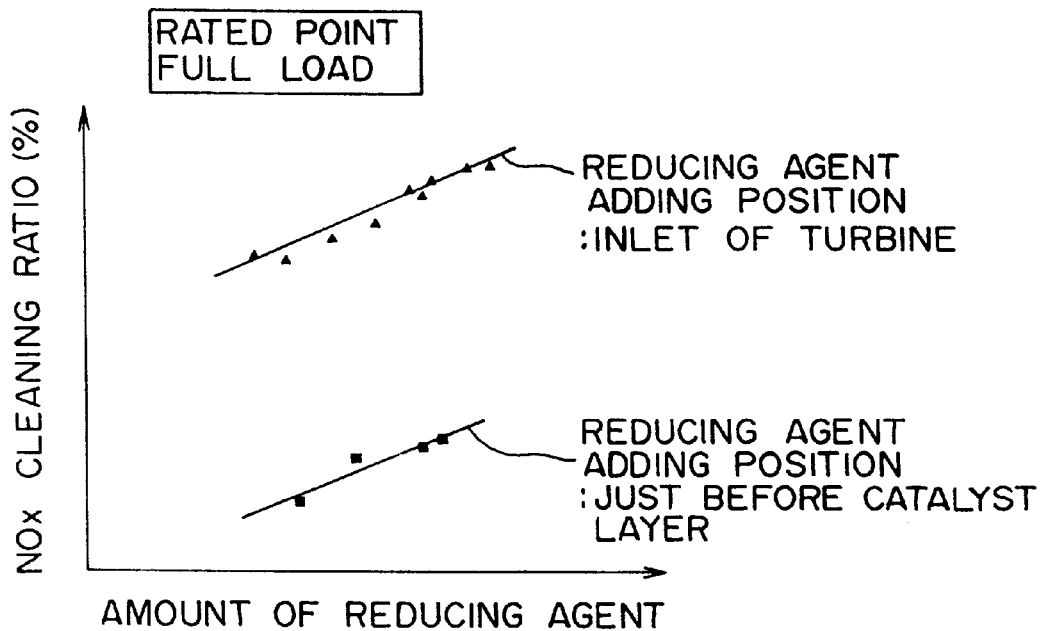
FIGS. 6 to 8 illustrate the relationship between the amount of the reducing agent fuel and the NOx cleaning ratio in different engine loads in the first embodiment.
Figure 7:
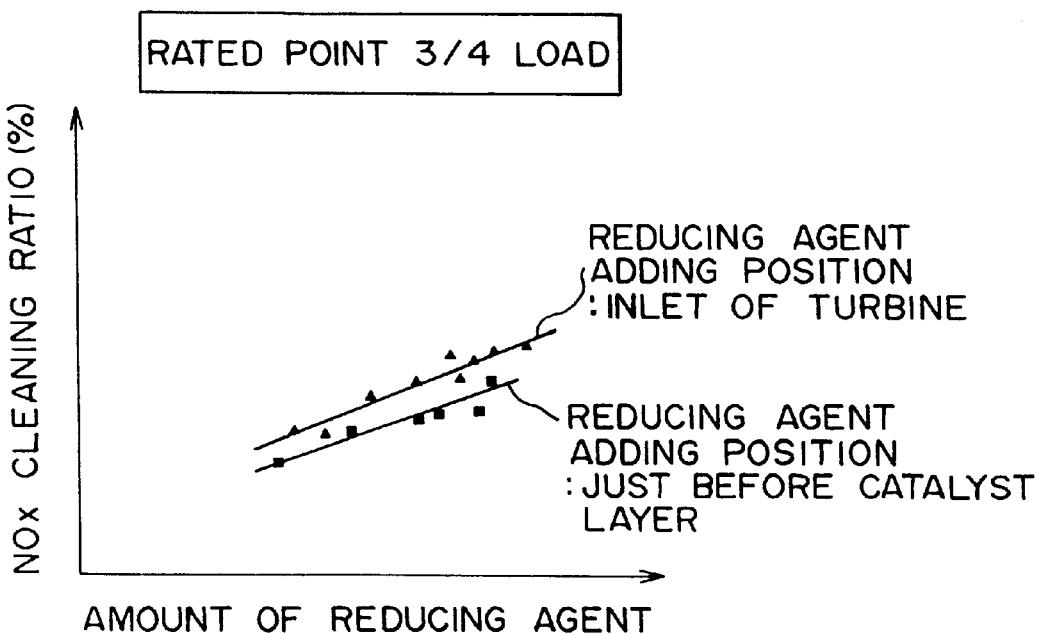
Figure 8:
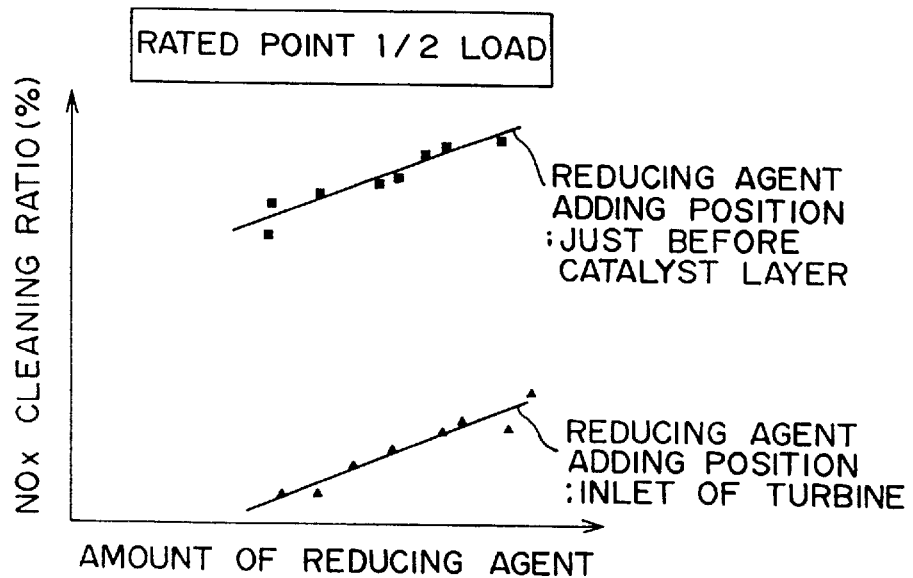

The NOx cleaning ratio in this embodiment will be described with reference to FIGS. 6 to 8. Incidentally, the amount of the reducing agent fuel represented by the horizontal axis employs the ratio of the weight of the reducing agent fuel to the weight of NOx in the exhaust gas. FIG. 6 illustrates a case where the engine load ratio is a rated rotational full load, in which the best NOx cleaning ratio can be obtained when the reducing agent fuel adding position is near the inlet of the turbine 3, i.e., the first nozzle 5 shown in FIG. 5. In the case of the rated rotational ¾ load in which an exhaust temperature is medium, whether the reducing agent adding position is near the inlet of the turbine 3 or just before the catalyst bed 4, the difference therebetween is small, and great effect is not always obtained, as shown in FIG. 7. In the case of the rated rotational ½ load, the best NOx cleaning ratio can be obtained when the reducing agent fuel adding position is just before the catalyst bed 4, i.e., the second nozzle 6 shown in FIG. 1, as shown in FIG. 8.

Therefore, according to this embodiment, a good NOx cleaning ratio can be obtained at wide-ranging exhaust gas temperatures. However, it is more preferable to increase the NOx cleaning ratio when the exhaust temperature is medium, such as when the engine load ratio is the rated rotational ¾ load.

To solve this problem, a second embodiment will be described in which one reducing agent adding position is added to the first embodiment.

Figure 9:
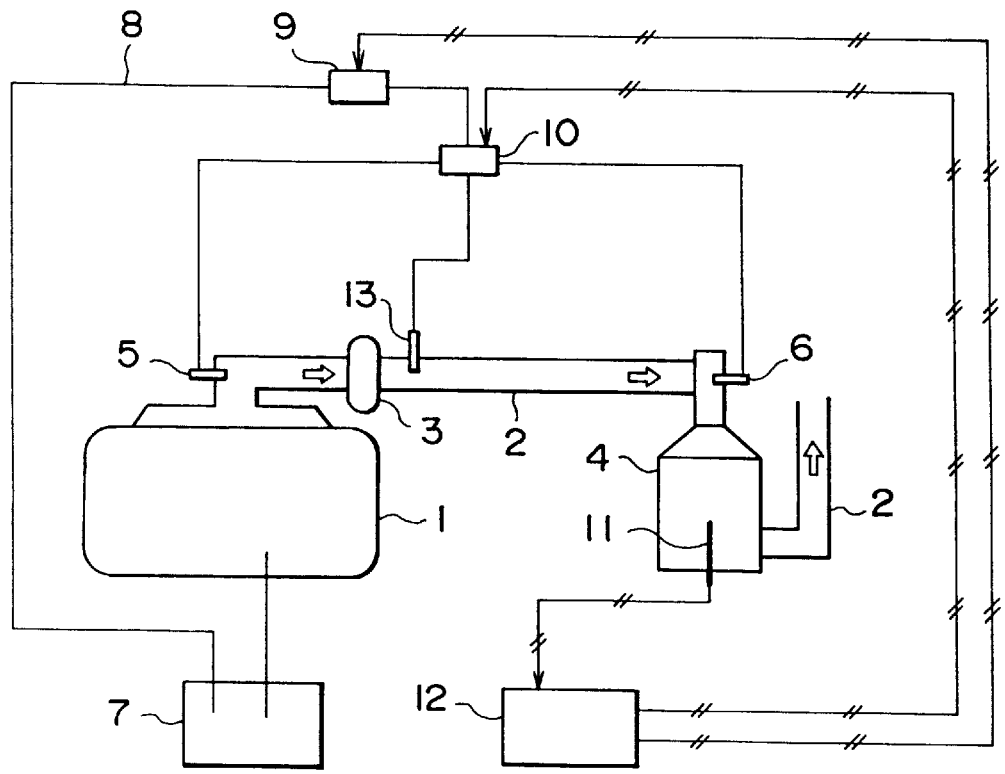
FIG. 9 illustrates a construction of an exhaust denitration device according to a second embodiment of the present invention.
Figure 10:
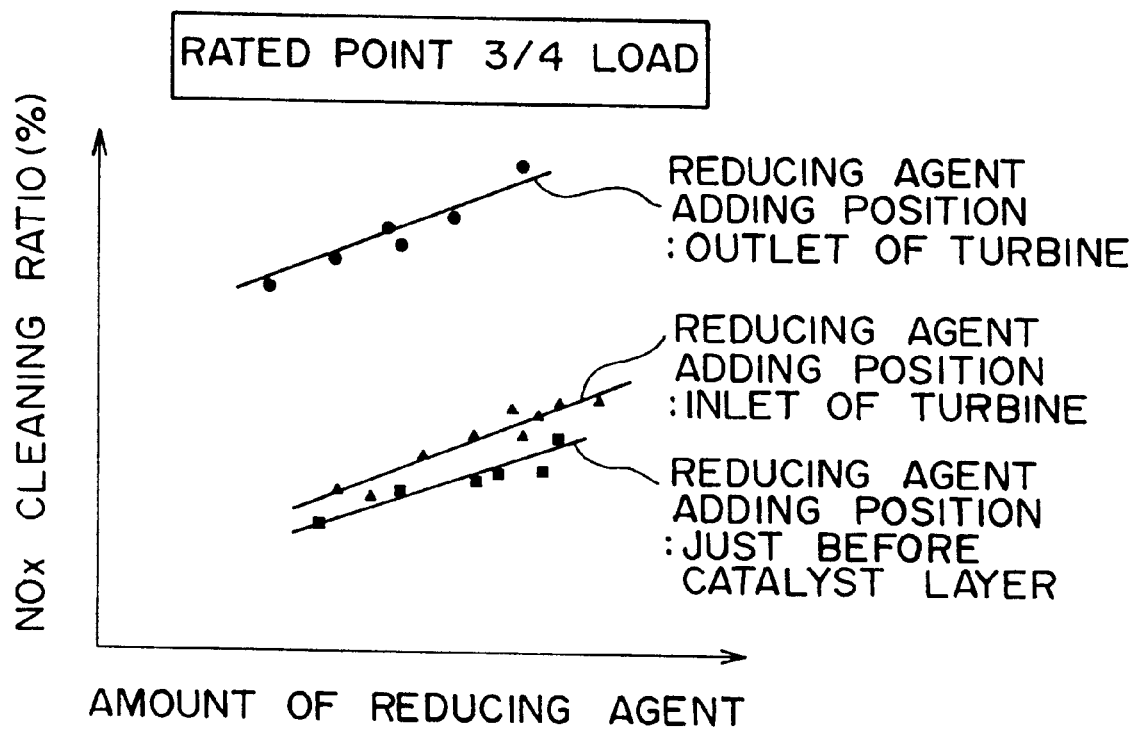
FIG. 10 is a diagram relating to the second embodiment, and showing relationship between the amount of reducing agent fuel and the NOx cleaning ratio when the engine is at the rated point ¾ load.
Figure 11:
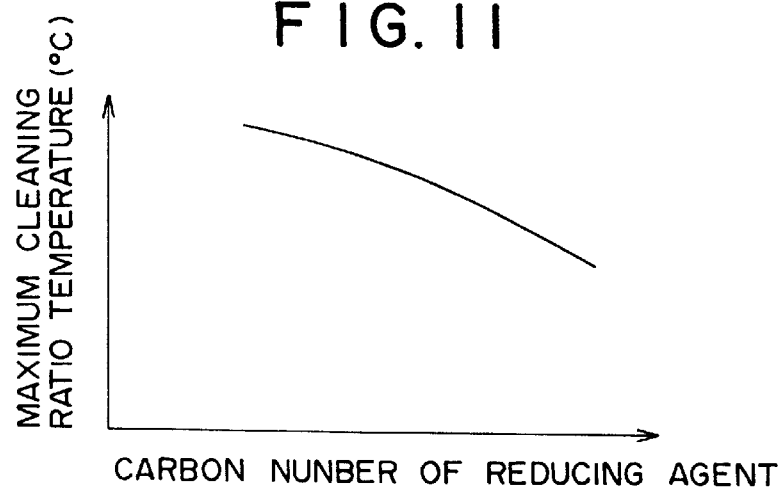
FIGS. 11 to 13 are diagrams illustrating a basic idea of the present invention.
Figure 12:
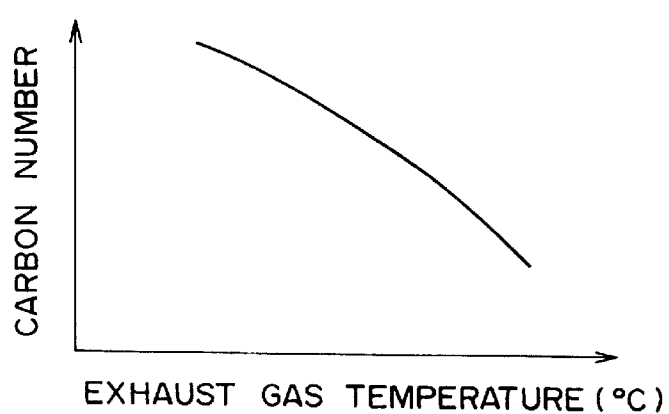
Figure 13:
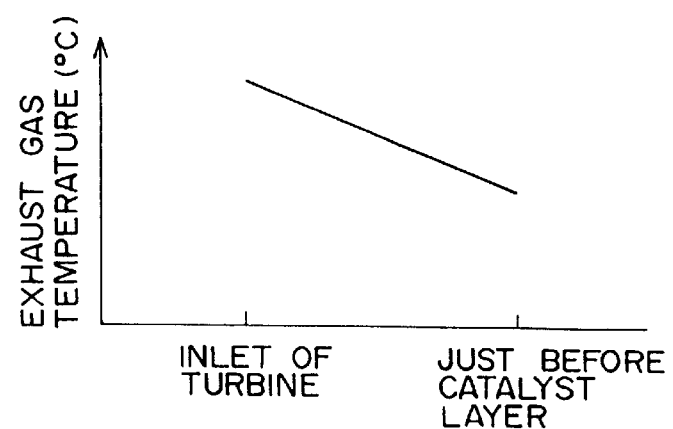

Referring to FIG. 9, a reducing agent fuel adding nozzle 13 (hereinafter, referred to as a third nozzle 13), which is a supply means of the reducing agent fuel, is disposed in the exhaust pipe 2 adjacent an outlet of the turbine 3. In addition, the third nozzle 13 can add the reducing agent fuel to the exhaust pipe 2 by the valve 10, which is switched by a command signal of the controller 12. With reference to the NOx cleaning ratio in the construction as described above, the case of the rated rotational ¾ load in which an exhaust temperature is medium is shown in FIG. 10. That is, the NOx cleaning ratio is not high similar to FIG. 7 when the reducing agent fuel adding position is just before the inlet of the turbine 3 or just before the catalyst bed 4, but a high NOx cleaning ratio can be obtained by adding the reducing agent fuel from the third nozzle 13 disposed just after the outlet of the turbine 3. This is assumed that the reducing agent fuel added from the third nozzle 13 thermally decomposes to middle-class hydrocarbons by which a high NOx ratio can be easily obtained during the medium temperature, and exhibits high-efficiency NOx cleaning performance.

Although metal-supporting catalysts are used in the above-described first and second embodiments, the present invention is not limited thereto, and zeolite-series catalysts can be used. However, if the zeolite-series catalysts are used, the relationship between the catalyst bed temperature and the number of carbon atoms per molecule of the reducing agent hydrocarbon when using the metal-supporting catalysts is reversed. Thus, selection of the reducing agent fuel adding position should be also reversed. In addition, according to the present invention, although the catalyst bed temperature is detected to control the system, the temperature of the exhaust gas at the inlet of the catalyst bed can be used as the detected temperature.

INDUSTRIAL APPLICABILITY

The present invention is useful as an exhaust denitration device for a diesel engine which can sufficiently clean NOx under a wide-range of engine operating conditions in spite of a simple structure, because reducing agent adding positions are selected and controlled according to the catalyst bed temperature, i.e., the magnitude of the engine load.

I claim:

1. Apparatus comprising:
   a diesel engine having at least one cylinder;
   a catalyst bed;
   an exhaust pipe connecting the at least one cylinder of said diesel engine to said catalyst bed for receiving exhaust gases from said at least one cylinder and for passing the thus received exhaust gases through said catalyst bed; and
   first and second reducing agent supply devices positioned at spaced apart locations along said exhaust pipe between said at least one cylinder of said diesel engine and said catalyst bed for supplying a reducing agent into the exhaust gases in said exhaust pipe,
   wherein said reducing agent is supplied only from one of said first and second reducing agent supply devices at any point in time,
   wherein said first and second reducing agent supply devices are positioned such that a temperature of the exhaust gases passing said first reducing agent supply device is substantially different from the temperature of the exhaust gases passing said second reducing agent supply device, and
   whereby the catalyst bed utilizes the thus supplied reducing agent to reduce NOx contained in the exhaust gases.

2. Apparatus comprising:
   a diesel engine having at least one cylinder;
   a catalyst bed;
   an exhaust pipe connecting the at least one cylinder of said diesel engine to said catalyst bed for receiving exhaust gases from said at least one cylinder and for passing the thus received exhaust gases through said catalyst bed;
   first and second reducing agent supply devices positioned at spaced apart locations along said exhaust pipe between said at least one cylinder of said diesel engine and said catalyst bed for supplying a reducing agent into the exhaust gases in said exhaust pipe; and
   an exhaust turbocharger mounted in said exhaust pipe between said diesel engine and said catalyst bed, said exhaust turbocharger having a turbine, said turbine having an inlet connected to said exhaust pipe and an outlet connected to said exhaust pipe,
   whereby the catalyst bed utilizes the thus supplied reducing agent to reduce NOx contained in the exhaust gases, and
   wherein said first reducing agent supply device is positioned between an exhaust valve of said diesel engine and the inlet of said turbine, and wherein said second reducing agent supply device is positioned between the outlet of said turbine and said catalyst bed.

3. Apparatus in accordance with claim 2, further comprising:
   a third reducing agent supply device for supplying a reducing agent into the exhaust gases in said exhaust pipe;
   wherein said second reducing agent supply device is positioned adjacent to said catalyst bed; and
   wherein said third reducing agent supply device is positioned adjacent to said outlet of said turbine and is spaced from said second reducing agent supply device.

4. Apparatus in accordance with claim 3, wherein said controller selects one of said first, second, and third reducing agent supply devices based on said detected temperature and allows said reducing agent to be supplied via the thus selected reducing agent supply device into said exhaust pipe.

5. Apparatus in accordance with claim 1, further comprising:
   a fuel tank;
   a fuel supply device for supplying fuel from said fuel tank; and
   a control valve connected to an output of said fuel supply device for selectively passing fuel from said fuel supply device to said first and second reducing agent supply devices.

6. Apparatus in accordance with claim 5, further comprising:
   a controller;
   a temperature sensor, for detecting a temperature of said catalyst bed and for inputting a detected temperature signal to said controller;
   wherein said controller actuates said control valve to select one of said first and second reducing agent supply devices based on said detected temperature and to allow said fuel to be supplied via the thus selected reducing agent supply device into said exhaust pipe.

7. Apparatus comprising:
   a diesel engine having at least one cylinder;
   a catalyst bed;
   an exhaust pipe connecting the at least one cylinder of said diesel engine to said catalyst bed for receiving exhaust gases from said at least one cylinder and for passing the thus received exhaust gases through said catalyst bed;
   first and second reducing agent supply devices positioned at spaced apart locations along said exhaust pipe between said at least one cylinder of said diesel engine and said catalyst bed for supplying a reducing agent into the exhaust gases in said exhaust pipe;
   a controller; and
   a temperature sensor, for detecting a temperature of said catalyst bed and for inputting a detected temperature signal to said controller,
   whereby the catalyst bed utilizes the thus supplied reducing agent to reduce NOx contained in the exhaust gases, and
   wherein said controller selects only one of said first and second reducing agent supply devices based on said detected temperature and allows said reducing agent to be supplied via the thus selected reducing agent supply device into said exhaust pipe.

8. Apparatus comprising:
a diesel engine having at least one cylinder;
a catalyst bed;
an exhaust pipe connecting the at least one cylinder of said diesel engine to said catalyst bed for receiving exhaust gases from said at least one cylinder and for passing the thus received exhaust gases through said catalyst bed;
first and second reducing agent supply devices positioned at spaced apart locations along said exhaust pipe between said at least one cylinder of said diesel engine and said catalyst bed for supplying a reducing agent into the exhaust gases in said exhaust pipe;
a controller;
a temperature sensor, for detecting a temperature of said catalyst bed and for inputting a detected temperature signal to said controller; and an exhaust turbocharger mounted in said exhaust pipe between said diesel engine and said catalyst bed, said exhaust turbocharger having a turbine, said turbine having an inlet connected to said exhaust pipe and an outlet connected to said exhaust pipe,
whereby the catalyst bed utilizes the thus supplied reducing agent to reduce NOx contained in the exhaust gases,
wherein said controller selects one of said first and second reducing agent supply devices based on said detected temperature and allows said reducing agent to be supplied via the thus selected reducing agent supply device into said exhaust pipe, and
wherein said first reducing agent supply device is positioned between an exhaust valve of said diesel engine and the inlet of said turbine, and wherein said second reducing agent supply device is positioned between the outlet of said turbine and said catalyst bed.

9. Apparatus in accordance with claim 8, further comprising:
a third reducing agent supply device for supplying a reducing agent into the exhaust gases in said exhaust pipe;
wherein said second reducing agent supply device is positioned adjacent to said catalyst bed; and
wherein said third reducing agent supply device is positioned adjacent to said outlet of said turbine and is spaced from said second reducing agent supply device.

10. Apparatus in accordance with claim 9, wherein said controller selects one of said first, second, and third reducing agent supply devices based on said detected temperature and allows said reducing agent to be supplied via the thus selected reducing agent supply device into said exhaust pipe.

11. Apparatus in accordance with claim 10, further comprising:
a fuel tank;
a fuel supply device for supplying fuel from said fuel tank;
a control valve connected to an output of said fuel supply device for selectively passing fuel from said fuel supply device to said first, second, and third reducing agent supply devices.

12. Apparatus in accordance with claim 11, wherein said controller actuates said control valve so as to select one of said first, second, and third reducing agent supply devices based on said detected temperature and to allow said fuel to be supplied via the thus selected reducing agent supply device into said exhaust pipe as a reducing agent.

13. A method of reducing NOx in exhaust gases from a diesel engine, said method comprising the steps of:
passing exhaust gases from the diesel engine through an exhaust pipe to a catalyst bed;
selecting a location from a plurality of locations along said exhaust pipe so that the exhaust gases passing said location have a temperature which is substantially different from the temperature of the exhaust gases passing another of said plurality of locations; and
supplying a reducing agent into the exhaust gases in said exhaust pipe at only the thus selected location,
wherein the catalyst bed utilizes said reducing agent to reduce NOx contained in said exhaust gases.

14. A method in accordance with claim 13, wherein said reducing agent is a fuel for said diesel engine.

15. A method in accordance with claim 13, further comprising:
detecting a temperature of the exhaust gases; and
controlling the selection of the location in accordance with the thus detected temperature.

16. A method in accordance with claim 15, wherein the temperature of the exhaust gases is detected by detecting a temperature of said catalyst bed.

17. A method of reducing NOx in exhaust gases from a diesel engine, said method comprising the steps of:
passing exhaust gases from the diesel engine through an exhaust pipe to a catalyst bed;
selecting a location from a plurality of locations along said exhaust pipe;
supplying a reducing agent into the exhaust gases in said exhaust pipe at the thus selected location,
wherein the catalyst bed utilizes said reducing agent to reduce NOx contained in said exhaust gases,
wherein an exhaust turbocharger is mounted in said exhaust pipe between said diesel engine and said catalyst bed, said exhaust turbocharger having a turbine, said turbine having an inlet connected to said exhaust pipe and an outlet connected to said exhaust pipe;
wherein a first one of said plurality of locations is positioned between an exhaust valve of said diesel engine and the inlet of said turbine, and
wherein a second one of said plurality of locations is positioned between the outlet of said turbine and said catalyst bed.

18. A method in accordance with claim 17, wherein said second one of said plurality of locations is positioned adjacent to said catalyst bed; and
wherein a third one of said plurality of locations is positioned adjacent to said outlet of said turbine and is spaced from said second one of said plurality of locations.

19. A method in accordance with claim 17, wherein said catalyst bed comprises a metal supporting catalyst, wherein said first one of said plurality of locations is selected when said detected temperature is higher than a predetermined temperature, and wherein said second one of said plurality of locations is selected when said detected temperature is lower than the predetermined temperature.

20. A method in accordance with claim 17, wherein said catalyst bed comprises a zeolite catalyst, wherein said first one of said plurality of locations is selected when said detected temperature is lower than a predetermined temperature, and wherein said second one of said plurality of locations is selected when said detected temperature is higher than the predetermined temperature.

* * * * *